(12) United States Patent
Tiusanen

(10) Patent No.: US 9,673,912 B2
(45) Date of Patent: Jun. 6, 2017

(54) EMISSION POWER CONTROLLED RADIO SIGNAL EMITTING NODE

(71) Applicant: SOIL SCOUT OY, Helsinki (FI)

(72) Inventor: Johannes Tiusanen, Vanha-Ulvila (FI)

(73) Assignee: SOIL SCOUT OY (FI)

( * ) Notice: Subject to any disclaimer, the term of this patent is extended or adjusted under 35 U.S.C. 154(b) by 0 days.

(21) Appl. No.: 15/032,746

(22) PCT Filed: Oct. 30, 2014

(86) PCT No.: PCT/IB2014/065712
§ 371 (c)(1),
(2) Date: Apr. 28, 2016

(87) PCT Pub. No.: WO2015/063717
PCT Pub. Date: May 7, 2015

(65) Prior Publication Data
US 2016/0285566 A1 Sep. 29, 2016

(30) Foreign Application Priority Data

Nov. 1, 2013 (EP) ..................................... 13397535

(51) Int. Cl.
 H04B 13/02 (2006.01)
 H04L 12/26 (2006.01)
 H04W 4/00 (2009.01)
(52) U.S. Cl.
 CPC ............. *H04B 13/02* (2013.01); *H04L 43/04* (2013.01); *H04W 4/005* (2013.01)

(58) Field of Classification Search
 CPC .............................. H04B 13/02; H04B 5/0037
 See application file for complete search history.

(56) References Cited

U.S. PATENT DOCUMENTS 8,035,403 B1 * 10/2011 Campbell ............ A01G 25/167
324/694

FOREIGN PATENT DOCUMENTS

WO   WO8912330   * 12/1989 ............... H01Q 1/04
WO   WO 8912330    12/1989

OTHER PUBLICATIONS

International Search Report in PCT Application PCT/IB2014/065712, Feb. 11, 2015, EPO.

(Continued)

*Primary Examiner* — Tuan H Nguyen

(57) ABSTRACT

A radio signal emitting node (25, 38) is configured to emit a radio signal when buried in soil (10). The node (25, 38) comprises an antenna (20, 39), an integrated electronic circuit (22) electrically connected to the antenna (20, 39) using a feed line (15, 17, 18), and at least one sensor (30) for generating measurement data (31). The integrated circuit (22) is configured to operate the antenna (20, 39) to emit the radio signal containing the measurement data (31) periodically or upon receiving a wireless request (32). The radio signal emitting node (25, 38) is configured to allow a surrounding medium of the soil (10) to influence the near field of the antenna (20, 39) when the node (25, 38) is buried in soil (10) and to decrease or prevent the radio signal emission in case the influence of the surrounding medium onto the near field is withdrawn.

17 Claims, 4 Drawing Sheets

(56) References Cited

OTHER PUBLICATIONS

J. Tiusanen, "Validation and results of the soil scout radio signal attenuation model", Biosystems Engineering, vol. 97, 2007.
J. Tiusanen. "Wireless Soil Scout prototype radio signal reception compared to the attenuation model", Precision Agriculture, vol. 10, No. 5, Nov. 28, 2008.
J. Tiusanen. "Attenuation of a soil Scout Radio Signal", Biosystems Engineering, vol. 90, No. 2, Feb. 1, 2005.
International Preliminary Report on Patentability in PCT/IB2014/065712, Dec. 1, 2015, EPO.

* cited by examiner

EMISSION POWER CONTROLLED RADIO SIGNAL EMITTING NODE

FIELD OF INVENTION

The invention relates to a radio signal emitting node configured to emit a radio signal with a radio emission power when buried in soil.

BACKGROUND OF INVENTION

Wireless underground radio signal emitting nodes have been employed for monitoring soil parameters over longer periods of time. Said nodes are commonly also referred to as "soil scouts" and find various applications in agricultural applications. The nodes are employed to monitor, for example moisture or temperature using the corresponding sensors. However, since they are buried underground, mostly on fields or other agricultural zones, a lot of effort has been made in the past to properly transmit the measurement data of the sensors to a radio station or a radio unit collecting the measurement data at certain time intervals over a longer period of time, like months or even years.

In the focus of research and development was typically the high attenuation caused by the soil and its effects on the design of the antennas. Since the node has to be installed just below the ploughing depth or a depth that is sufficient to protect it, a considerable radio emission power has to be employed in order to transmit the measurement data through the soil and also through the air in order to reach the radio station or any other radio unit collecting the measurement data.

In the research paper "Validation and results of the soil scout radio signal attenuation model", Biosystems Engineering 97 (2007) 11/19 by J. Tiusanen the above mentioned problems of under soil monitoring in agriculture were already considered. It was recognized that a node with a convenient range of operation would need to emit with a power, which would violate radio band regulations.

SUMMARY OF THE INVENTION

In this rather new technology, the inventor has recognized that the emission power of said nodes, in fact, violates in many cases the present radio band regulations in most countries. A considerable danger exists that such a node is brought up to the surface of the soil during ploughing action, where it would emit without sufficient soil attenuation. Even though the radio signal emitting nodes are usually employed only for a couple of milliseconds for requesting and sending the desired measurement data the violation of the radio band regulations would be inevitable.

One aim of the invention consists of the desire to comply with present radio band regulations in the respective countries, where said nodes are deployed.

Another aim of the invention is to quickly identify radio signal emitting nodes, which have been displaced from their intended position within the soil. Such nodes would also inevitably deliver incorrect measurement data, either because the sensor is measuring at the surface or because the sensor has been damaged or disconnected from the node. Eventually, both cases would lead to inappropriate agricultural decision making.

According to the invention a radio signal emitting node is configured to emit a radio signal with a radio emission power when buried in soil, said node comprising:

an antenna;
an integrated electronic circuit being electrically connected to the antenna using a feed line; and
at least one sensor for generating measurement data;
whereas the integrated circuit is configured to operate the antenna to emit the radio signal containing said measurement data periodically or upon receiving a wireless request.

The desired aims are reached by the radio signal emitting node being configured to allow a surrounding medium of the soil to influence the near field of the antenna, when said node is buried in soil. The radio signal emitting node further has been configured to decrease the radio emission power or to prevent the radio signal emission in case the influence of the surrounding medium onto the near field is withdrawn, when said node is removed from the soil. In other words, radio signal emitting node is configured to couple the emitted radio power from the antenna to the soil in the electromagnetic near field, as long as said node is buried in soil, but further the node is configured to decrease the radio emission power or to prevent the near field from coupling to a surrounding medium of the soil.

With soil it is referred to the ground in the most general sense. The soil may comprise or consist of rock, pebbles, earth, sand, humus or organic substances, in particular, soil may consist of a mixture of said substances including the microorganisms living therein. Hence, soil can also comprise or consist of turf, compost or the like.

The radio emission power of said node must be high, because when buried in soil it must generate a measurable radio signal, which has to travel through soil and thereafter in air. Emission power is decreased, once the removal from soil would cause a radio signal of very high power in air, which generally does not comply with the radio band regulations.

Depending on the ploughing depth the radio signal emitting nodes are placed at soil depths of typically 10 cm, 25 cm or 40 cm. The position depends on the respective application and can, of course, differ from said soil depths. Correspondingly, the operational radio emission power in soil may also vary in dependence on the assigned depth.

The near field of the antenna and/or field line is referring to the surrounding region of the antenna defined by approximately half a wavelength of the emitted radiation. The node passes the near field out to the surrounding medium, which belongs to the soil and can take influence onto the near field of the antenna and/or field line. The node allows the near field to overlap with the surrounding medium by comprising the corresponding shape, in particular, a particular housing around the antenna and/or feed line.

The at least one sensor generates measurement data, which allow conclusions to be made on the soil conditions in the node's proximity. The at least one sensor provides the measurement data to the radio signal emitting node and said node integrates the measurement data into its radio signal.

Since the radio emitting nodes are meant to remain in the soil for many years the continued ploughing action and erosion may lead to a considerable change of the node position, which then can be monitored or at least the node takes the necessary steps to prevent any violation of the radio regulations.

A preferred embodiment of the node has a battery supplying power to the integrated circuit. It is advantageous to choose batteries with a long lifetime, in order to reduce maintenance efforts or to even avoid any maintenance other than placing the nodes underground and removing them at the end of the battery lifetime.

In a preferred embodiment of the node the radio signal emitting node has been adapted to decrease the radio emission power or to prevent the radio signal emission in case the influence of the surrounding medium onto the near field is withdrawn, when said node is removed from the soil, in a passive manner.

The action of the node is taken without any active detection of the radio emission power increase or an impedance change. Simply the removal of the surrounding medium of the soil creates the condition required to cause the adjustment of the radio emission power. This is carried out by withdrawing the influence of the surrounding medium onto the antenna, the feed line or the integrated circuit or any other component of the node.

Advantageously, the node is configured to attenuate the radio emission power or even shut down the radio signal emission completely, depending on the undesired node position inside or above the soil. For example, if the node has been brought up by ploughing action or else to the surface of the soil, it is in most cases advisable to stop radio emission completely. Alternatively, the radio emission is attenuated to a degree that still complies with the general radio band regulations. Also, the radio emission power can be attenuated according a degree of the remaining soil coverage of the node to fulfill the radio regulations in air.

Advantageously, the adaptation of the emission power has been implemented, at least partly, by utilizing the contribution of permittivity and/or permeability of the soil to the operation impedance of the antenna and/or its feed line. Other qualities of the soil, such as the permeability or the like, may also be deployed accordingly.

In a preferred embodiment, a change from the buried state to an unburied state of the node causes an impedance change of the antenna and/or its feed line turning the operational impedance into a mismatched impedance. The operational impedance of the antenna and/or its feed line is optimized for radio emission when covered by a layer of soil. The layer of soil may have various influences on the radio signal emitting node. One of them, for example, is the attenuation of the radio signal and another one is the possible influence on the impedance of the antenna and/or its feed line, which is in particularly altered if the soil reaches the near field region of the antenna. In both cases the antenna might be optimized in terms of size and dimension for radio emission under soil. The general aim is to maintain acceptable radio signal strength in the surrounding air above the soil. If the impedance is mismatched the state of standard operation of the node is abandoned. At small depths the mismatched impedance may indicate a wrong depth in the soil, either too deep of too close to the surface. In particular, when the surface is reached the impedance is mismatched to indicate the displacement. At greater depths the impedance will hardly or not at all be affected by a displacement of the radio emitting node, however, the attenuation by the soil is primarily affected.

In a preferred embodiment, due to the mismatched impedance the antenna is operable with a low emission power, is operable with an allowed emission power or is not operable. In dependence of the respective application the most useful measure might be chosen. For example, if the recollection of a node at mismatched impedance is not desired, it is most convenient to stop the operation. However, if the node still might contain important measurement data a continued emission at an allowed power level might be advisable. Also, if the node contains contaminating substances, it should be removed from the soil by the end of its lifetime. Therefore, a recollection of the node is made possible if the antenna is still operable with low emission power.

In a preferred embodiment the node comprises at least one depth controller, and the radio signal emitting node has been adapted to decrease the radio emission power or to prevent the radio signal emission in case the influence of the surrounding medium onto the near field is withdrawn, when said node is removed from the soil, in an active manner in response to measurement data from said at least one depth controller.

Advantageously, depending on position data originated from said at least one depth controller said node is operable with a low emission power, is operable with an allowed emission power or is not operable. Possible reasons for the respective measures were given in relation to the passive manner of detection. They apply also to the active detection.

Advantageously, the node, in particular the depth controller, generates position data containing information on the current position of the node within the soil. The depth may be deducted from the impedance of the antenna and/or its feed line, or the variance of the daily temperature cycle. This way it is possible to identify the relative movement of the node in reference to the soil surface over longer periods of time and act accordingly. Therefore, for example, a user does not have to wait until the node is brought up to the surface completely by the ploughing action. Instead he is able to decide upon the removal of the node or an alternative measure, such as simply adding more soil onto the surface and correct the position of the node this way.

In a preferred embodiment a change between a covered and an uncovered state of the radio signal emitting node is detected by the node measuring a corresponding impedance change of the antenna and/or its feed line. Once a defined impedance threshold is surpassed the change of states takes place, which typically happens during ploughing action. Additionally, the node may monitor or store its position data of the node.

In a preferred embodiment the antenna is inoperable in the uncovered state due to the corresponding impedance change of the antenna and/or its feed line. This way the antenna, including its feed line, can be made part of a control unit or forms the control unit itself, which is used to control and/or adjust the radio emission power. It is advantageous, because the control unit is easily realizable within said integrated circuit.

One possibility to match the operation impedance is setting the dimensions of the feed line accordingly, whereby the feed line preferably is implemented as a microstrip line. The radio power is fed to the antenna through the feed line, the operation impedance of which has been matched by setting the width w of the feed line and the distance h from a grounded plate in such a manner that the feed line impedance is matched to the antenna when soil is present in the near field of the feed line. If the node is lifted out from soil, the feed line goes out of tune. Hence, a too large radio emission power is prevented in a passive manner.

In a preferred embodiment the integrated circuit is adapted to monitor the impedance of the antenna and/or its feed line and is enabled to initiate an alternative measure, preferably an acoustic signal upon wireless request, if an impedance threshold is surpassed. Also other signals might be used to indicate that the node has been displaced within the soil. The integrated circuit may also be adapted to still record data in an integrated storage of the integrated circuit in order to enable the read-out at a later time. An alternative measure is also a fluorescent element or fluorescent tag, which becomes activated above soil, said element either being powered by the node or alternatively by the sun or an ultraviolet light source. Hence the node's visibility on the soil surface can be substantially improved to find the displaced node more easily. Since the node itself does not have much electric energy after a longer period of use, it is better to have the sun charge the fluorescent element, which has come up from underground together with the node, with optical energy, enabling the user to recognize the node during the night. One might actively search for the tagged node using said ultraviolet light source, which supplies energy to the fluorescent element in the moment it shines upon it. Ideally the fluorescent element comprises or consists of a fluorescent ribbon or a fluorescent surface coating.

Advantageously, the width w of the feed line is between 1 to 2 mm, preferably 1.5 mm. Also here, emission conditions as well as conditions for the supply of the alternating current are taken into account. In experiment said dimensions of the feed line were found to be very effective.

In a preferred embodiment the feed line forms a straight line over all or nearly all its length L in the conductive plane of the antenna. Preferably, the feed line may also be connected with another conductive plane of a multi-layer circuit board. On such boards the conductive planes are also referred to as layers.

In a preferred embodiment the antenna is a monopole antenna with a diameter and the feed line having a feed line length L of 60% to 80% of the diameter D, that is $0.6*D \leq L \leq 0.8*D$. The feed line has the task to connect the monopole antenna with an amplifier and thereby enable the electric oscillations within the monopole antenna required for radio transmission. The design of the feed line also influences the magnetic and electric fields within the near field of the antenna and hence should be of the ideal length L as confirmed in experiment.

In a preferred embodiment the at least one sensor is integrated fully or partially into the integrated circuit. Also the number of sensors may vary. Ideally the number varies between one, two or three sensors, which might be placed or integrated in the integrated circuit for different reasons. Having a multiple of sensors with the radio signal emitting node avoids undesired maintenance problems in case a sensor fails during the lifetime period of the node. Then simply one or two other sensors take the place of the broken sensor. Alternatively, it might be useful to consider measurement data, which was taken at different sensor locations, like on top of the radio signal emitting node and/or below it. For that reason it could be useful not to integrate the at least one sensors into the integrated circuit of the node, but to have them connected using a cable in order to achieve a certain distance amongst the sensors leading to more reliable measurement data. However, in some applications this might be problematic, since a cable connection always bears a risk of moisture entering the housing of the radio signal emitting node and thereby destroying it over a longer period of time. Hence the integration of the at least one sensor into the integrated circuit of the radio signal emitting node might be a safer solution.

In a preferred embodiment the at least one sensor is a soil parameter sensor, for example, a moisture sensor, a soil conductivity sensor, an acidity sensor or temperature sensor. The choice of the sensor type depends on the respective application or needs of the user taking decisions on the respective project. The radio signal emitting node may be used in dependence on its at least one sensor. A node with a moisture sensor may be used for humidity monitoring of building floors, fundaments and/or agricultural fields, or for the detection of flood embankments or undercutting of fluvial erosion. A node with an acidity sensor might be used to monitor industrial zones of chemical or pharmaceutical factories to monitor undesired contaminations of the soil. Further applications in other technical or non-technical areas depending on the type of the at least one sensor are also possible.

In a preferred embodiment the radio signal emitting node has a storage for measurement data originating from the at least one sensor. In fact, the storage may be used for the measurement data of other sensors to enable a failure analysis at a later time. The failure analysis may be initiated by a wireless request or by removing the radio signal emitting node from its position in the soil and have it connected to an analyzing system. The storage might also be used for node position data. This way the taken measurement data can be understood better by relating them to the node position data.

In a preferred embodiment the antenna and circuit parts of the integrated circuit are located on opposite sides of the multi-layered circuit board. The antenna and the circuit parts of the integrated circuit are located at different conducting layers of a multi-layer circuit board, whereas the respective layers are parallel to each other. This leads to a radio signal emitting node, which is small in size and can be placed and handled easily.

In a preferred embodiment the node comprises a coating and/or a cover to define a minimal distance between the soil and the antenna and/or the feed line in the buried state, the coating and/or cover preferably being an integral part of a housing of said node. By defining said minimal distance the influence of the soil onto the operative impedance can be controlled easily. Also the near field can be passed advantageously over the surrounding medium of the soil to give best coupling results.

A preferred embodiment is a sensor system with at least one radio signal emitting node according to the invention and a radio unit to request and/or obtain measurement data from the node. In particular, a mobile radio unit is extremely useful to find and locate radio signal emitting nodes and check them for maintenance. Also measurement data can be retrieved by a mobile radio unit. On the contrary, a fixed radio unit or radio station might be of interest, since the process of retrieving measurement data can be done automatically without the interference of personnel leading to a very cost effective procedure and also a more reliable one.

Other favorable embodiments and advantageous implementations of the invention are described in the drawings or the dependent claims.

BRIEF DESCRIPTION OF THE DRAWINGS

In the following, the invention is explained in more detail with reference to the example shown in the attached drawings in FIGS. 1 to 5, of which.

The same reference numerals refer to same components in all FIGS.

DETAILED DESCRIPTION OF PREFERRED EMBODIMENTS

Figure 1:
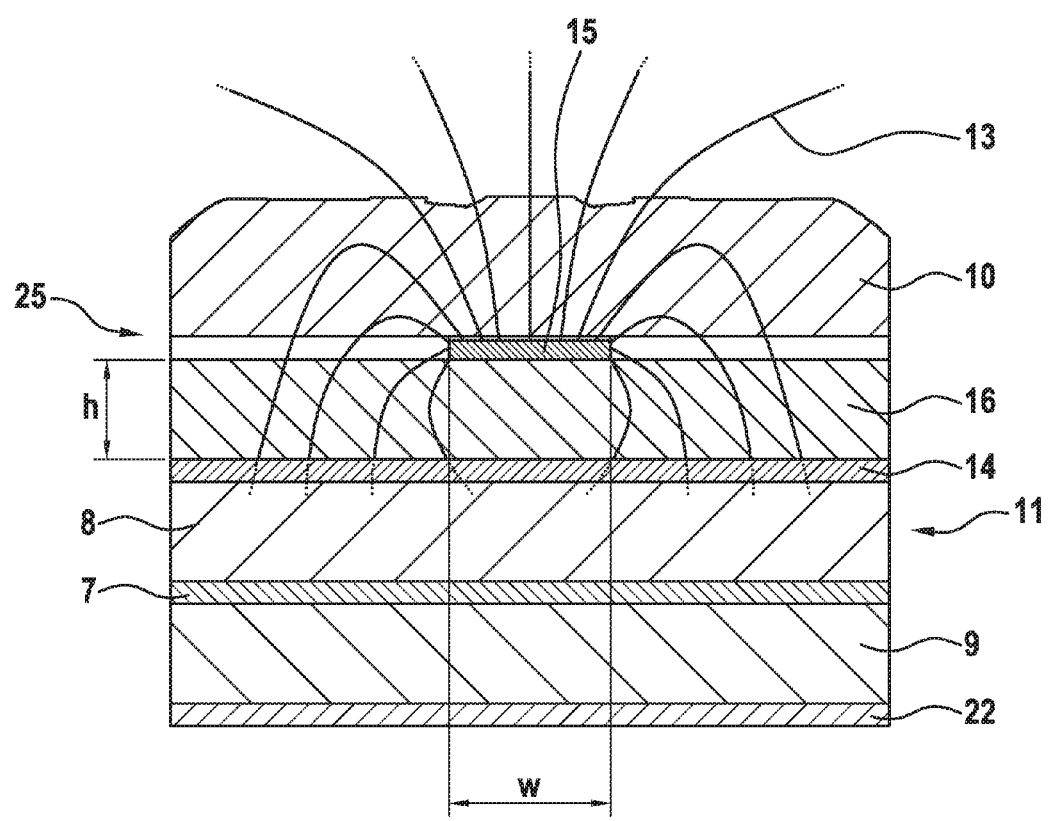
FIG. 1 shows a multi-layered circuit board of a radio signal emitting node placed under soil.

FIG. 1 shows the radio signal emitting node 25 with four conductive layers. Layer 14 is the grounded layer (GND) and the outer conductive layer hosts the antenna (not shown) and its feed line 15. The choice of the distance h is crucial to implement the desired impedance of the feed line 15 having the width w.

In other the layer 22 an integrated circuit is implemented with various components having the functions of running the antenna, store measurement date, read out a sensor or similar. The multilayered circuit board 11, in particular the feed line 15 is placed in proximity to the soil 10. This means that in the near field, indicated by the magnetic field lines 13, the soil 10 takes influence on the permittivity as well as the susceptibility to influence the impedance of the antenna and/or its feed line 15. In other words, the antenna and/or its feed line 15, as well as the grounded conductive layer 14, are designed taking the influence of the soil 10 into account for an optimum radio signal emission at a certain soil depth.

The conductive layer 7 may comprise an integrated sensor, such as a moisture sensor or a temperature sensor or an otherwise sensing element, such as a temperature dependent resistance. In order to save space, layer 7 may also contain parts or components of the integrated circuit 22.

Figure 2:
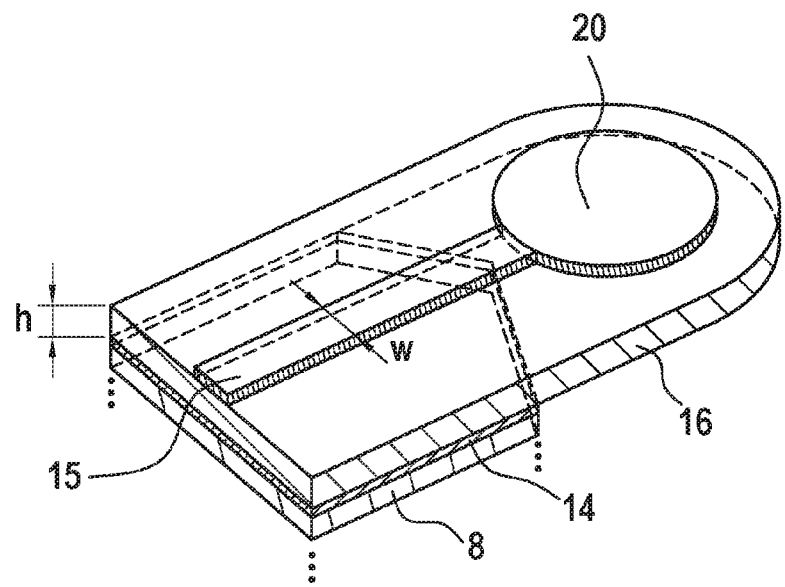
FIG. 2 shows the multi-layered circuit board of the radio signal emitting node of FIG. 1.

FIG. 2 shows the multilayered circuit board 11 of the radio signal emitting node 25 of FIG. 1 in a three dimensional perspective. The monopole antenna 20 is located in the same conductive layer like the feed line 15, which has the task to electrically connect the antenna 20 to one of the other conductive layers, in particular, the layer on the opposite side of the node 25 comprising the integrated circuit 22.

The non-conductive base board 16 comprising the antenna 20 is made of glass fiber and does not have any conductive relevance, just as the non-conductive layers 8, 9. Their thickness may be chosen due to capacitance and/or stability considerations.

In the embodiment the non-conductive base board 16 and/or the non-conductive layers 8,9 are made out of glass fiber FR-4, which is very flame resistant material. Alternatively, the non-conductive base board 16 and/or the non-conductive layers 8,9 are made of polytetrafluorethylene (PTFE) or any other isolating laminate, resin, glass fiber or similar.

Figure 3:
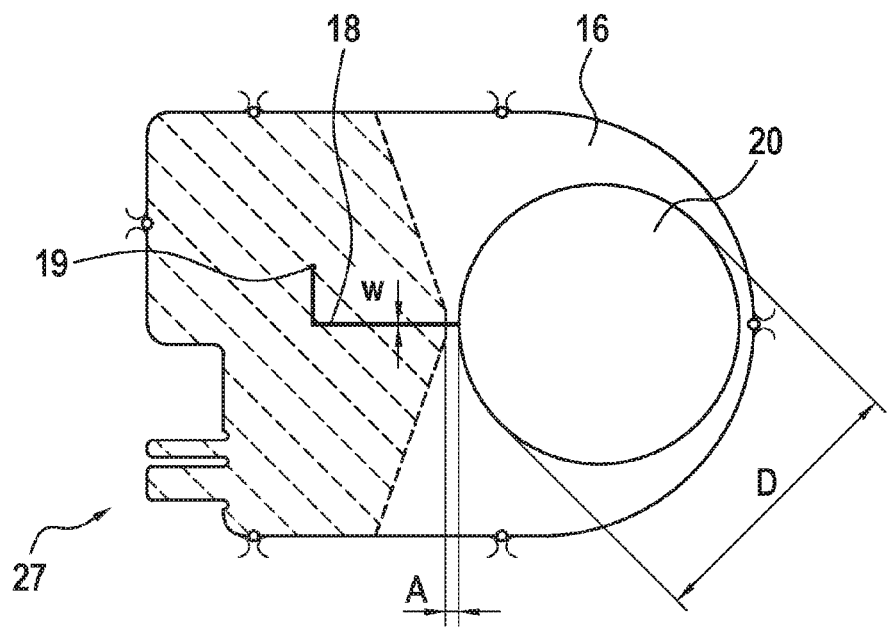
FIG. 3 shows a non-conductive base board of a second embodiment of a radio signal emitting node.

FIG. 3 shows the non-conductive base board 16 comprising a monopole antenna 20 and its feed line 18 of another radio signal emitting node differing in the shape of its feed line 18. The feed line 18 and the monopole antenna 20 are elements of a conductive layer, which is the outermost conductive layer of the multi-layered circuit board. The position and guiding of the feed line 18 in respect to the grounded conductive layer 14 is crucial for the emission characteristics. It is advantageous to have the least bends possible in the feed line 18. However, in the embodiment of FIG. 3 there is only one bent in the conductive plane of the antenna 20 in order to reach the connection point 19, which establishes electrical contact to the integrated circuit 22. Therefore the feed line 18 is—up to a certain degree— adjustable to the requirements of the integrated circuit 22.

It is also advantageous if the integrated circuit 22 is located on a parallel conductive layer of the multi-layer circuit board, in particular the opposite outermost layer in respect to the conductive layer of the antenna 20.

In the embodiment the antenna 20 has a diameter of D=32 mm and a feed line length of L=24 mm. The radio signal emission frequency is 870 MHz. Since the antenna 20 behaves nearly as a one-lambda (full wave) antenna, the near field surrounds the antenna 20 in a distance of approximately 100 mm when the soil is wet. In dry soil the near field is smaller than 100 mm. This is experimentally confirmed by the strong impedance dependency in the depth between 0 and 10 cm. For greater depths the impedance does not change much, since the entire near field is filled with soil.

Figure 4:
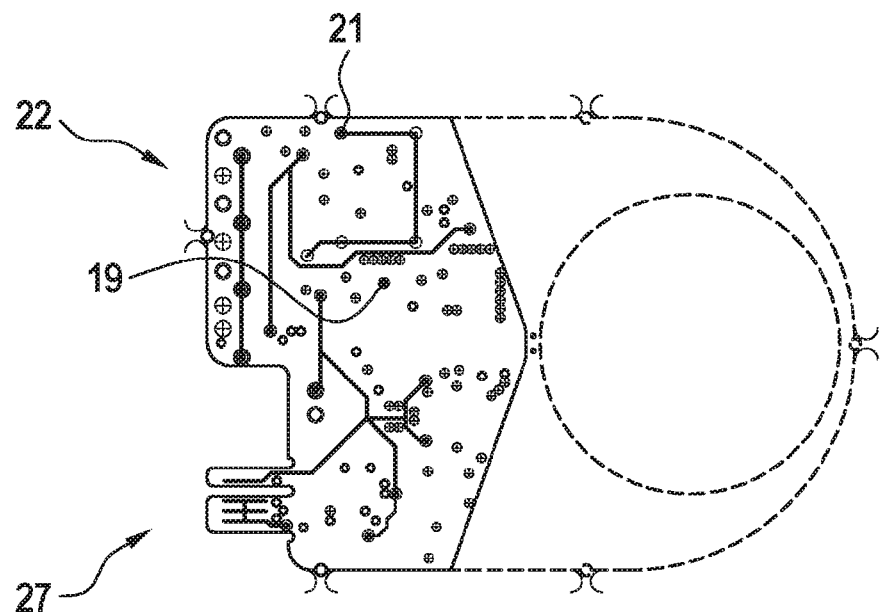
FIG. 4 shows the integrated circuit of the second embodiment of FIG. 3.
Figure 5:
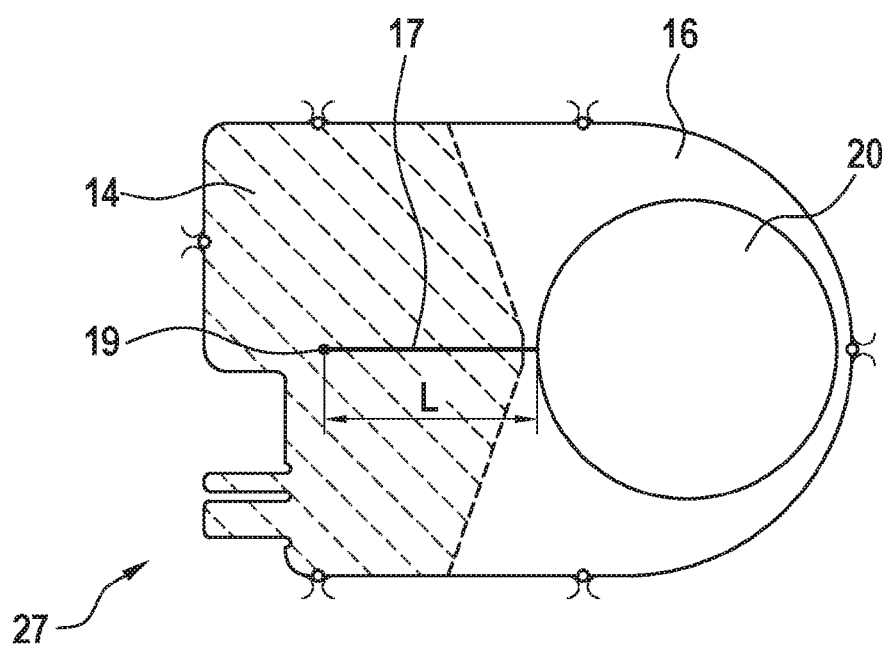
FIG. 5 shows the non-conductive base board of a radio signal emitting node with a straight feed line in the conductive layer of the antenna.

Typical emission frequencies are 500 MHz to 2 GHz, whereby around 1 GHz a very good efficiency can be achieved. The radio signal emitting nodes of FIGS. 3 to 5 are configured for a carrier frequency of 870 MHz. In air the radio signal emitting nodes might have an emission power of 20 to 25 dBm (100 to 500 mW) over a duration of a few milliseconds, which should be all right for the mentioned radio frequency band in most countries, but it might be too much for others considering the local radio bandwidth regulations.

FIG. 4 shows the integrated circuit 22 of the embodiment of FIG. 3 indicating the connection point 12, where the feed line 18 is connected with the integrated circuit 22. Connection point 12 is electrically connected to the connection point 19 of FIG. 3. Furthermore, there are several electrical components, such as resistors, capacitors and inductive elements, which can be electrically connected with each other by the conductor board of the integrated circuit 22.

The signal emitting nodes 25, 38 of all FIGs are shown without a power supplying battery. However, they are all connectable to a power supplying battery. The signal emitting node of FIG. 4, for instance, can be connected with the positive pole of a battery in at contact 21. The area 27 is intended to host a connection port for data transfer and programming of the radio signal emitting node.

FIG. 5 shows another embodiment of a radio signal emitting node with a non-conductive base board 16, just like the non-conductive base board 16 of the radio signal emitting nodes of FIGS. 1,2 and 3, whereas the feed line 17 has no bends in the outermost conducting layer of the multilayered circuit board. The length L is the length from the antenna 20, which is of circular shape, to the connection point 23, which is used to carry the electrical contact down to one of the parallel conducting layers, ideally the layer of the integrated circuit 22. The feed line 17 is very straight and has therefore a positive effect on the emission characteristics.

The position of the neighboring grounded conductive layer 14 is indicated by the dashed lines and shows the proximity of the antenna 20 to the grounded layer 14, whereas most of the feed line 17 is located in parallel to layer 14. Advantageously, the connection point 19 could be moved without restraining the integrated circuit too much.

Figure 6:
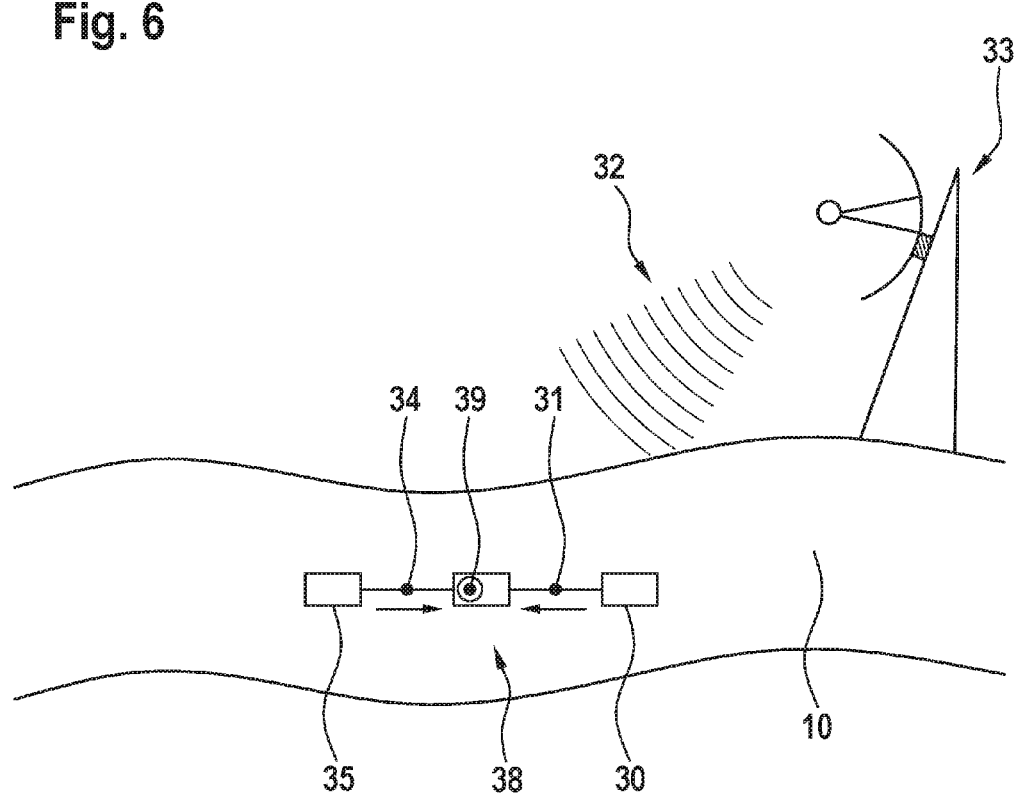
FIG. 6 shows a radio signal emitting node with external sensors in communication with a stationary radio unit.

FIG. 6 shows a stationary radio unit 33 sending a request to the node 38 for emitting a radio signal containing measurement data 31 from the moisture sensor 30. The node 38 requests the data from the moisture sensor 30 and obtains the measurement data 31 stating a water content of the soil 10.

The antenna 39 may be used to receive the request 32 as well as sending the measurement data 31 out to the stationary radio unit 33.

Alternatively, the node 38 is not configured for a two-way communication at all, but simply sends without receiving any request 32 or other radio signals (monoplex transmission). The node 38 could be configured to regularly send measurement data at reasonable or definable temporal intervals, such as once a day or once an hour. This allows the node 38 to have a very basic and therefore very robust design.

The depth controller 35 retrieves position data by, for example, measuring temperature. The daily fluctuations in temperature allow the conclusion how deep the node 38 is still buried in the soil 10. The measured temperatures are passed to the node 38 as position data 34. Either the node 38 analyzes the fluctuations itself to send a warning message or simply transmits the daily fluctuations, which are then analyzed externally in the radio station 10 or elsewhere.

Ideally, the depth controller 35 and the sensor 30 are integrated into the node 38, in particular, into its integrated circuit. Like this the node 38 can be designed as a cost-effective single housing device. Also, the risk of moisture entering the housing of the node 38 is considerably lower.

In summary, the invention relates to a radio signal emitting node 25, 38 comprising
  an antenna,
  an integrated electronic circuit 22 being electrically connected to the antenna 20 using feed line 15,17,18,
  at least one sensor, whereas the integrated circuit 22 operates the antenna 20 upon wireless request to emit a radio signal containing measurement data obtained from the at least one sensor.

In order to comply with current radio band regulations the invention suggests to passively adjust the impedance of the antenna 20 and/or its feedline 15, 17, 18 and thereby control the radio emission power according to a degree of soil coverage of the node 25, 38.

REFERENCE NUMERALS USED

D diameter of the antenna
h distance between neighboring conductive layers
L length of feed line
w width of the feed line
7 conductive layer
8 non-conducting layer
9 non-conducting layer
10 soil
11 multi-layered circuit board
12 connection point
13 magnetic field line
14 grounded conductive layer
15 feed line
16 non-conductive base board
17 feed line
18 feed line
19 connection point
20 antenna
21 contact
22 integrated circuit
23 connection point
25 radio signal emitting node
27 connection area
30 moisture sensor
31 measurement data
32 request
33 stationary radio unit
34 position data
35 depth controller
38 radio signal emitting node
39 antenna

The invention claimed is:

1. A radio signal emitting node (25, 38) configured to emit a radio signal with a radio emission power when buried in soil (10), said node (25, 38) comprising:
  an antenna (20, 39);
  an integrated electronic circuit (22), electrically connected to the antenna (20, 39) a feed line (15, 17, 18); and
  at least one sensor (30), electronically coupled to said integrated electronic circuit, for generating measurement data (31);
  whereas the integrated electronic circuit (22) is configured, responsive to said measurement data and generated by said at least one sensor (30), to operate the antenna (20, 39) to emit the radio signal containing said measurement data (31) periodically or upon receiving a wireless request (32);
  characterized in that: the radio signal emitting node (25, 38) is configured to allow a surrounding medium of the soil (10) to influence a pear field of the antenna (20, 39), when said node (25, 38) is buried in soil (10),
  and wherein the radio signal emitting node (25, 38) is further configured to decrease the radio emission power or to prevent the radio signal emission in case the influence of the surrounding medium onto the near field is withdrawn, when said node (25, 38) is removed from the soil (10).

2. The radio signal emitting node (25, 38) according to claim 1, wherein:
  the radio signal emitting node (25, 28) is configured to decrease the radio emission power or to prevent the radio signal emission in case of the influence of the surrounding medium onto the near field is withdrawn, when said node (25, 38) is removed from the soil (10) in a passive manner.

3. The radio signal emitting node (25, 38) according to claim 2, wherein
  the radio signal emitting node (25, 28) is configured to decrease the radio emission power or to prevent the radio signal emission at least in part by utilizing the contribution of at least one permittivity and permeability of the soil (10) to at least one of an operation impedance of the antenna (20, 39) and its feed line (15, 17, 18).

4. The radio signal emitting node (25, 38) according to claim 3, wherein:
  a change from a buried state to an unburied state of the radio signal emitting node (25, 38) causes an impedance change of at least one of the antenna (20, 39) and its feed line (15, 17, 18) turning the operational impedance into a mismatched impedance.

5. The radio signal emitting node (25, 38) according to claim 4, wherein:
  due to the mismatched impedance, the antenna (20, 39) is operated with a low emission power, is operated with an allowed emission power level or is not operated.

6. The radio signal emitting node (25, 38) according to claim 1, wherein:
  the radio signal emitting node (25, 38) comprises at least one depth controller (35), and wherein the radio signal emitting node (25, 38) is configured to decrease the radio emission power or to prevent the radio signal emission in case of the influence of the surrounding medium onto the near field is withdrawn, when said node (25, 38) is removed from the soil (10) in an active manner in response to measurement data (31) from said at least one depth controller (35).

7. The radio signal emitting node (25, 38) according to claim 6, wherein:
  In response to position data (34) originating from said at least one depth controller (35), said radio signal emitting node (25, 38) is operated with a low emission power, is operated with an allowed emission power or is not operated.

8. The radio signal emitting node (25, 38) according to claim 1, wherein:
said feed line (15, 17, 18) has a width (w) of between 1 to 2 mm.

9. The radio signal emitting node (25, 38) according to claim 1, wherein:
the feed line (15, 17, 18) forms a straight line over all or nearly all a length (L) in a conductive plane of the antenna (20, 39).

10. The radio signal emitting node (25, 38) according to claim 1, wherein:
the antenna (20, 39) is a monopole antenna (20, 39) with a diameter (D) and wherein the feed line (15, 17, 18) has a feed line length (L) of between 60% to 80% of the diameter (D), 0.6*D≤L≤0.8*D.

11. The radio signal emitting node (25, 38) according to claim 1, wherein:
the at least one sensor (30) is integrated fully or partially into the integrated circuit (22).

12. The radio signal emitting node (25, 38) according to claim 1, wherein:
the at least one sensor (30) is a soil parameter sensor (30).

13. The radio signal emitting node (25, 38) according to claim 12, wherein:
the soil parameter sensor (30) is selected from the group of soil parameter sensors consisting of a moisture sensor (30), a soil conductivity sensor, an acidity sensor and a temperature sensor.

14. The radio signal emitting node (25, 38) according to claim 1, wherein:
said radio signal emitting node (25, 38) includes a data storage for the measurement data (31) originating from the at least one sensor (30).

15. The radio signal emitting node (25, 38) according to claim 1, wherein said radio signal emitting node (25, 38) is fabricated on a non-conductive base board (16), and wherein:
the antenna (20, 39) and at least some circuit parts of the integrated circuit (22) are disposed on opposite sides of a multi-layered circuit board (11) disposed on said non-conductive base board (16).

16. The radio signal emitting node (25, 38) according to claim 1, wherein:
the radio signal emitting node (25, 38) comprises at least one of a coating and a cover to define a minimal distance between the soil (10) and at least one of the antenna (20, 39) and the feed line (15, 17, 18) when said radio signal emitting node (25, 38) is in a buried state, and wherein at least one of the coating and the cover is an integral part of a housing of said node (25, 38).

17. The radio signal emitting node (25, 38) according to claim 1, wherein at least one of said radio signal emitting nodes (25, 38) is electronically coupled and responsive to a radio unit (33), said radio signal emitting node (25, 38) and said radio unit (33) cooperating to form a sensor system, said radio unit (33) configured to, at least one of, request (33) or obtain measurement data (31) from the radio signal emitting node (25, 38).

* * * * *